(12) United States Patent
Das et al.

(10) Patent No.: US 12,406,145 B1
(45) Date of Patent: Sep. 2, 2025

(54) COMPOSITE SLOT TYPE FOR NATURAL LANGUAGE PROCESSING

(71) Applicant: Amazon Technologies, Inc., Seattle, WA (US)

(72) Inventors: Subhojit Das, Bellevue, WA (US); Arshit Gupta, Redmond, WA (US); Roger Scott Jenke, Seattle, WA (US); Chengshun Zhang, Bellevue, WA (US); Sudip Dutta, Seattle, WA (US); Aditi Tripathi, Seattle, WA (US); Yi Zhang, Sammamish, WA (US); Elman Mansimov, Brooklyn, NY (US); Sebastien Jean, New York, NY (US); Harshal Pimpalkhute, Redmond, WA (US); Sandeep Srinivasan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 348 days.

(21) Appl. No.: 17/810,325

(22) Filed: Jun. 30, 2022

(51) Int. Cl.
| | |
|---|---|
| G06F 40/35 | (2020.01) |
| G10L 15/01 | (2013.01) |
| G10L 15/183 | (2013.01) |
| G10L 15/22 | (2006.01) |

(52) U.S. Cl.
CPC .............. *G06F 40/35* (2020.01); *G10L 15/01* (2013.01); *G10L 15/183* (2013.01); *G10L 2015/228* (2013.01)

(58) Field of Classification Search
CPC ....... G06F 40/35; G10L 15/01; G10L 15/183; G10L 2015/228
See application file for complete search history.

(56) References Cited

U.S. PATENT DOCUMENTS

| | | | |
|---|---|---|---|
| 9,798,719 B2 | 10/2017 | Karov et al. | |
| 10,789,426 B2 | 9/2020 | Lavallee et al. | |
| 10,964,312 B2 | 3/2021 | Barton et al. | |
| 11,244,229 B2 | 2/2022 | Lindsley | |
| 2010/0070448 A1* | 3/2010 | Omoigui | H01L 27/1463 706/55 |
| 2018/0143857 A1* | 5/2018 | Anbazhagan | G06F 40/35 |
| 2019/0258710 A1* | 8/2019 | Biyani | G06F 40/295 |
| 2021/0377580 A1* | 12/2021 | Malboubi | H04N 21/47214 |

* cited by examiner

*Primary Examiner* — Daniel C Washburn
*Assistant Examiner* — Penny L Caudle
(74) *Attorney, Agent, or Firm* — S. Scott Foster; Kowert, Hood, Munyon, Rankin & Goetzel, P.C.

(57) ABSTRACT

A natural language processing system may implement one or more composite slot types. The natural language processing system may receive a request to create a composite parameter type for causing performance by the natural language processing system of an intended action. The natural language processing system determines based on the request, a plurality of sub-parameters of the composite parameter type and generates a Boolean expression that relates two or more sub-parameters. The natural language processing system may apply the composite parameter type to determine that the pluralities of sub-parameters in an input text satisfies the Boolean expression to initiate performance of the intended action.

20 Claims, 8 Drawing Sheets composite slot
type interface
300

Slot type: Cars  Info
A slot type is a list of values used to capture values for a slot.

▼ Slot type details

Composite slot type name
[ Cars ]
Maximum 100 characters, Valid characters: A-Z, a-z, 0-9,-,_

Description – optional
Helps you identify a slot on the list.
[                    ]
Maximum 200 characters.

Type: Composite
ID: AHPVZMJZPK

Sub-slots info sub-slot names 302

Sub-slot name | Sub-slot type
Color | 🔍 Colors ✕ | Remove
FuelType | 🔍 FuelTypes ✕ | Remove
SecondaryColor | 🔍 Colors ✕ | Remove
Model | 🔍 Models ✕ | Remove
VIN | 🔍 AlphaNumeric ✕ | Remove
YearNumber | 🔍 Years ✕ | Remove Add new Sub-slot sub-slot types 304

FIG. 3A

COMPOSITE SLOT TYPE FOR NATURAL LANGUAGE PROCESSING

BACKGROUND

Over recent years, the number of small-footprint sensor-containing devices such as smart phones, wearable devices, personal assistant devices and various other "Internet of Things" (IoT) devices which can be used for accessing a variety of distributed or remote applications has increased. Many of these devices contain sensors capable of detecting voiced or text-driven commands. The small-footprint devices are often designed to communicate with server farms at data centers which can be used to perform application tasks based on the input provided via the devices.

BRIEF DESCRIPTION OF THE DRAWINGS

FIG. 3A illustrates an example graphical user interface that may be used to receive a request to implement a composite slot type having multiple sub-slots, according to some embodiments.

Figure 1:
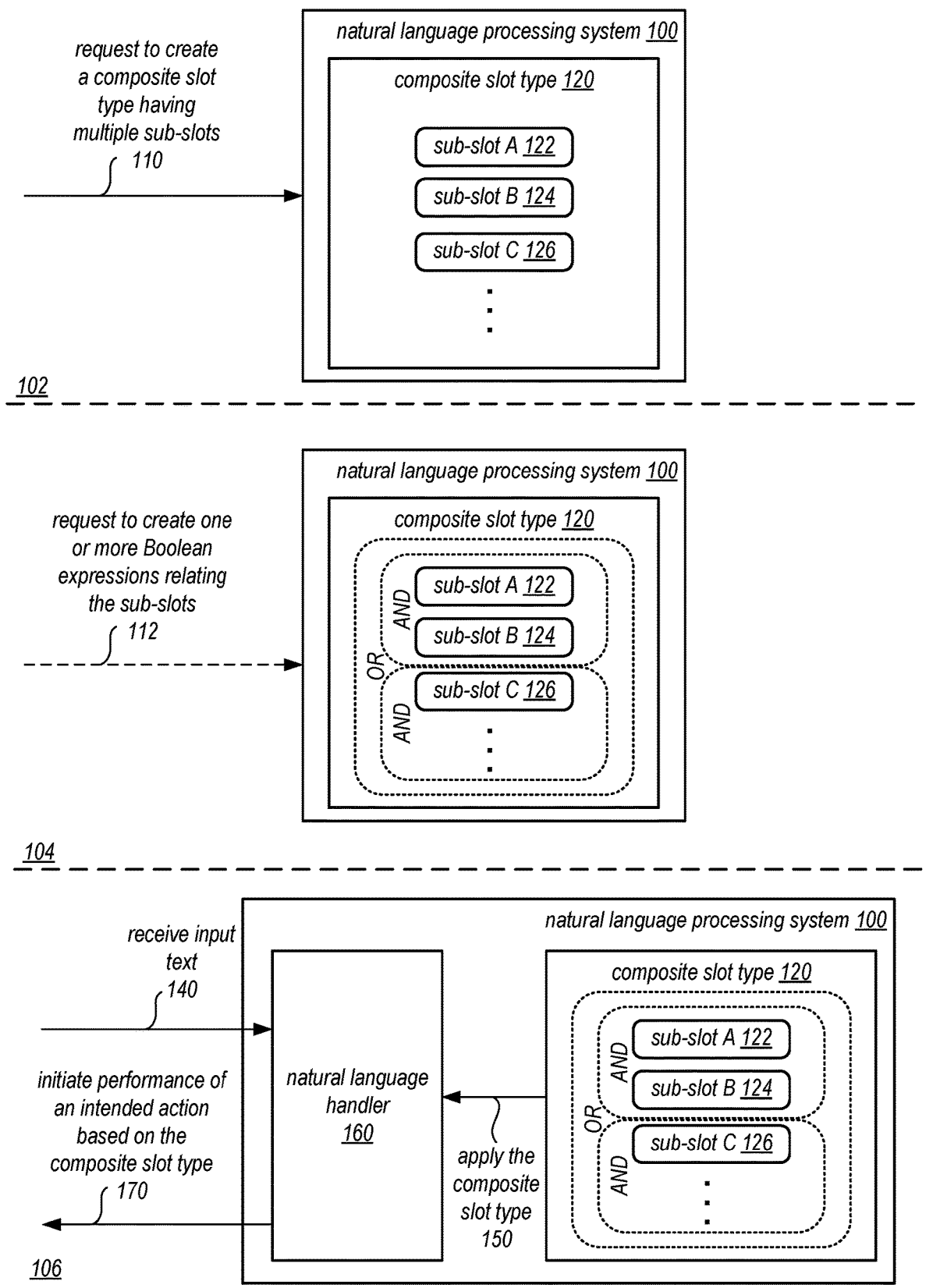
FIG. 1 illustrates a logical block diagram of generating a composite slot type for a natural language processing system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first sub-slot could be termed a second sub-slot, and, similarly, a second sub-slot could be termed a first sub-slot, without departing from the scope of the present invention. The first sub-slot and the second sub-slot are both sub-slot, but they are not the same sub-slot.

DETAILED DESCRIPTION OF EMBODIMENTS

Various techniques for composite slot type for natural language processing are described herein. Natural language processing systems have many different applications. For example, natural language processing systems may be useful in facilitating the use of various different systems, services, or applications by users without utilizing special interfaces, controls, protocols, or other interfaces. Moreover, natural language (e.g., human language that forms requests, instructions, or other interactions) may be used to interact with the different systems (e.g., voice commands to operate various devices) without necessarily using specialized interface knowledge. This is just one example and many other natural language processing systems may be implemented, such as natural language-based search or query interfaces for data stores.

In recent years the number of small-footprint sensor-containing devices such as smart phones, wearable devices, personal assistant devices and various other "Internet of Things" (IoT) devices that can collect voice or text signals have increased. Many customers may find it much more appealing or intuitive to, for example, order a meal using voiced/written commands than filling out a form on a computer screen. Users may prefer to use conversational or "natural" language to express their commands or intentions, in a manner similar to the way they would interact with other individuals, rather than being restricted to using specific "canned" phrases in a certain sequence. Applications which are designed to interact conversationally with users may be referred to as dialog-driven applications.

However, the interpretation of the signals received via the sensor-containing devices may pose a complex problem, especially in scenarios in which users are allowed to express themselves informally or conversationally. To interpret arbitrary voice commands, for example, sophisticated automated speech recognition (ASR) algorithms and/or natural language processing (NLP) algorithms may need to be employed. Furthermore, the interpretation of the signals may involve a detection of an "intent" or a representation of an action that the user wants to perform. The intent may specify parameters that indicate the information that is required to fulfill the user's request. These parameters also known as "slots" may respectively have an associated parameter type ("slot type"). In some embodiments, the slot type may be a list of values that may be used to train a machine learning model to recognize values for a slot. For example, for a slot type named "Genres", each value in its slot type may be the names of various genres such as "Comedy," "Adventure," "Documentary," etc. In some embodiments, a user may define a synonym for the slot type. For example, a user may define the synonyms "Funny" and "Humorous" for the slot type "comedy." In some embodiments, the natural language processing system may allow a user to generate a custom slot type. In addition to enabling users to generate custom slot types, the natural language processing system may allow the user to generate a composite slot type (or select a built-in composite slot type) that accept a set of sub-slots. For example, a user may create a user-specified "Make" slot type that accepts various vehicle Makers such as "Maker A", "Maker B", and "Maker C" as values.

A Composite slot type may consist of one or more custom and/or built-in slot types as its "sub-slot". The natural language processing system may allow a user to "club" or group together a coherent logical grouping of sub-slots that may be found naturally in physical world. For example, for a custom slot type named "Cars", various sub-slots named "Color", "FuelType", "Model", and "VIN", and may be grouped or "clubbed" together to define a semantic hierarchical structure of slots for the natural language processing system. The use of composite slot types that contains multiple sub-slots may allow the user to define a semantic hierarchical structure of slots and support a knowledge graph of slots and allow the natural language processing system to determine whether a user input is a semantically correct slot value. For example, the natural language processing system may determine that a user input of "Maker A, Model B, 2020" may not be a semantically correct slot value because "Maker A" does not produce "Model B". The composite slot type may allow natural language processing system to extend knowledge graph of sub-slots and enable slot type levels in the resolution strategy. Furthermore, the Boolean expressions from the various sub-types may enable the natural language processing system to drive the dialog policy at inference time as well as leverage the full and/or partial permutation and combination of sub-slots in driving the dialog policy.

FIG. 1 illustrates a logical block diagram of generating a composite slot type for a natural language processing system, according to some embodiments. In some embodiments, a natural language processing system 100 performs various processing tasks on an input text which may be provided directly from a user or from another application, such as speech recognition. The natural language processing system 100 may generate a composite slot type 120 to process one or more intended actions (e.g., an intent) with various parameters.

In scene 102, natural language processing system 100 may receive a request to create a composite slot type having multiple sub-slots 110. The natural language processing system 100 may generate a composite slot 120 having multiple sub-slots that may then be associated with the performance of an intended action. For example, the composite slot type 120 may have sub-slot A 122, sub-slot B 124, and sub-slot C 126 that identify the slots required to be fulfilled in order to perform the intended action. In some embodiments, the plurality of sub-slots may be of differing slot types. In some embodiments, the composite slot type may contain as a sub-slot a multi-value slot type (or a multi-value parameter type) that require multiple values to be fulfilled to satisfy its requirements. The sub-slot types are further discussed in detail below with regard to FIGS. 3A-3B. In some embodiments, Natural language processing system 100 may be a standalone system, service, or application, or in some embodiments, may be integrated as part of another application or service, such as the applications performing dialog driven actions as discussed in detail below with regard to FIGS. 2-4.

As illustrated in scene 104, in some embodiments, the natural language processing system 100 may receive a request to create one or more Boolean expressions relating the sub-slots 112. For example, based on the request to create the Boolean expressions 112, the natural language processing system 100 may generate a first Boolean expression associating sub-slot A 122 and sub-slot B 124 with an "and" operator. The natural language processing system 100 may generate a second Boolean expression associating sub-slot C 126 and the rest of the sub-slots with an "and" operator. The natural language processing system 100 may generate another Boolean expression associating with an "or" operator the sub-slots from the first Boolean expression and the sub-slots from the second Boolean expression. In some embodiments, the natural language processing system 100 may not receive any request to create Boolean expressions and the natural language processing system 100 may generate a single Boolean expression associating all of the sub-slots of the composite slot type with an "and" operator. In some embodiments, the Boolean expression may be used to determine whether the parameters or slots required to perform the intended action associate with the composite slot type is satisfied. For example, from the Boolean expressions illustrated in FIG. 1, the intended action associated with the composite slot may be satisfied with the fulfillment of either sub-slot A 122 and sub-slot 124 or sub-slot C 126.

As illustrated in scene 106, a natural language handler 160 of the natural language processing system 100 may detect an input text 140. In some embodiments, the natural language handler 160 may be any combination of tools that perform one or more required steps of: an automatic speech recognition, a natural language understanding, an intent classification, a slot labeling, or a slot resolution. The natural language handler 160 may apply the composite slot type 150, including the Boolean expressions, from the composite slot type 120 to initiate performance of an intended action 170. In some embodiments, the natural language processing system 100 may perform intermediate actions, such as a request for addition input text, to satisfy the requirements to perform the intended action. For example, the natural language handler 160 may determine from the input text that sub-slot A 122 is fulfilled, but that sub-slot B 124 and sub-slot C 126 are unfulfilled. Based on the unfulfilled sub-slot B 124, the natural language processing system 100 may request/prompt additional input text to fulfill either sub-slot A 122 or sub-slot C 126.

Please note that the previous description of composite slot for natural language processing is a logical illustration and thus is not to be construed as limiting as to the implementation of a natural language processing system, or various other illustrated features. For example, there may be more than three sub-slots in a given composite slot type, and/or the sub-slots may be associated together with various other Boolean expressions. In some embodiments, the natural language handler 160 may be broken into various smaller microservices.

This specification continues with a general description of a provider network that implements multiple different services, including a dialog driven application management service, which may include composite slot types. Then various examples of, including different components/modules, or arrangements of components/module that may be employed as part of implementing the services are discussed. A number of different methods and techniques to implement composite slot types are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
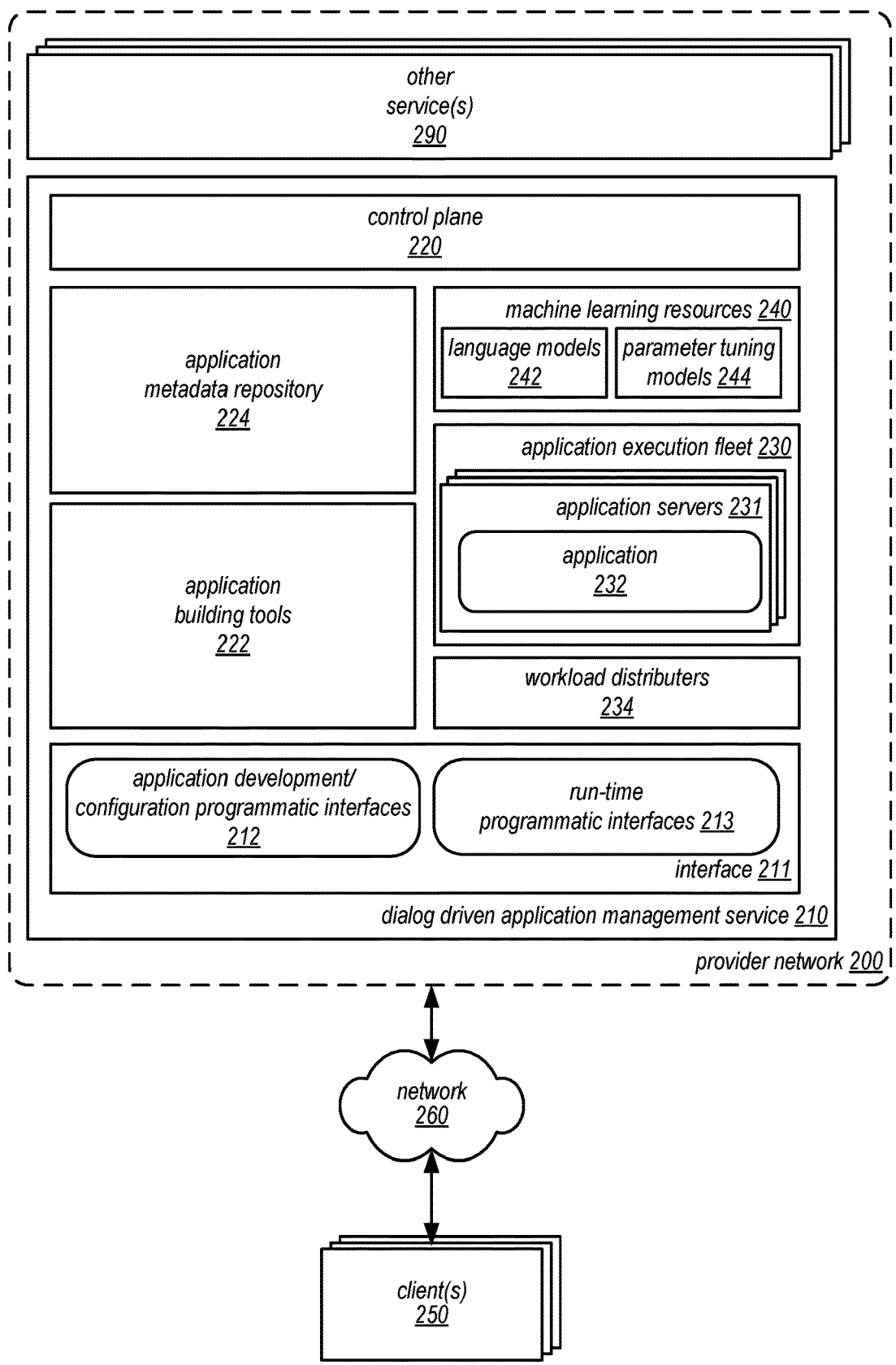
FIG. 2 illustrates an example provider network that may implement a natural language processing system that implements a composite slot, according to some embodiments.

FIG. 2 illustrates an example provider network that may implement a natural language processing system that implements a composite slot, according to some embodiments.

Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and services offered by the provider network 200, in one embodiment. In some embodiments, provider network 200 may implement various computing resources or services, such as dialog driven application management service 210, and/or any other type of network-based services 290 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within a computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of dialog driven application management service 210 may be implemented by a particular node or may be distributed across several nodes. In some embodiments, a given node may implement the functionality of more than one service system component (e.g., more than one data store component).

Dialog driven application management service 210 may implement interface 211 to allow clients (e.g., client(s) 250 or clients implemented internally within provider network 200, such as a client application hosted on another provider network service like an event driven code execution service or virtual compute service) to interact with dialog driven application management service. Interface 211 may be one or more [a] graphical user interfaces, programmatic interfaces that implement Application Program Interfaces (APIs) and/or a command line interfaces).

In some embodiments, interface 211 may be broadly classified into application development and configuration programmatic interfaces 212 and run-time programmatic interfaces 213. The application development and configuration programmatic interfaces 212 may be used by application owners and developers to create and provide preferred configuration settings for various dialog-driven applications which are to be executed using the application execution fleet 230, machine learning resources 240, and/or external task fulfillment resources, in various embodiments. Application owners may interact with the dialog driven application management service 210 via the interfaces 212 from a variety of application owner devices (e.g., on clients 250) in different embodiments, such as desktop computers, laptops, mobile devices and the like. Information about the dialog-driven applications, such as logical descriptors of the applications, program code (e.g., in source code or executable form), configuration settings for various stages or interaction categories of the applications, such as entity catalog(s), may be stored in an application metadata repository 224, in at least some embodiments.

End users (also referred to as clients) of dialog driven applications may interact with the applications via run-time programmatic interfaces 213 in the depicted embodiment. For example, the end users may provide input in the form of audio signals, to various sensors at end user devices (e.g., on clients 250). A variety of end user devices may be used to interact with dialog-driven applications in different embodiments, such as phones, tablet computing devices, wearable computing devices such as smart watches, game-playing devices or consoles, automated personal assistant devices, augmented reality devices, virtual reality devices, IoT devices, laptops, other mobile devices, desktops, compute instances of virtualized computing services, and so on. The end user input may be processed initially (e.g., subdivided into smaller units called events or blocks, each comprising a few hundred bytes of data) at dialog driven application management service 210 client-side components at the end user devices, and then representations of the end user-generated input may be transmitted to the dialog driven application management service 210 from the client-side components in the depicted embodiment via run-time programmatic interfaces 213. In some implementations, a client-side component may comprise one or more processes or threads of execution.

Depending on the type of action the end user wishes to perform using the dialog-driven application, several interactions with the dialog driven application management service 210 may be required, e.g., over one or more connections established between a client-side component and one or more application servers 231 in at least some embodiments. A given interaction may, for example, comprise transmission of a set of user-generated input to the application server, analysis of the user-generated initiated by the server (and performed, for example, using language models 242), and a response provided to the end user from the server. In at least some embodiments, one or more resources external to the dialog driven application management service may be used by servers 231 to initiate tasks of a dialog-driven application after a set of parameters for the tasks have been obtained from the user-generated input (e.g., implementing resources in other service(s) 290). Such tasks may include, for example, retrieval of requested bank or credit card information from a source such as a financial organization's database, ordering of an item from a catalog, and so on. External task fulfillment resources utilized by the servers 231 may include, for example, a dynamically-provisioned event driven computing service of provider network 200, other computing or storage services of a cloud computing environment, resources located at data centers of the application owners, and so on. The workload distributors 234, comprising one or more computing devices, may be responsible for selecting the particular server 231 in fleet 230 with which a given client-side component is to be connected, e.g., upon receiving a connection establishment request from the client-side component in various embodiments.

Dialog driven application management service 210 may implement a control plane 220 to perform various control operations to implement the features of dialog driven application management service 210. For example, control plane 220 may monitor the health and performance of requests at different components workload distributers, application servers 231, machine learning resources 240, application building tools 222, and application metadata repository 224 (e.g., the health or performance of various nodes implementing these features of dialog driven application management service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. In some embodiments, a composite slot type interfaces may a part of the application development/configuration programmatic interfaces 212 and may be used to configure one or more composite slot type to be used to process natural language inputs as discussed in detail above with regard to FIG. 1 and below with regard to FIGS. 3-5, in some embodiments.

Dialog driven application management service 210 may implement application building tools 222, in some embodiments. In various embodiments, representations or descriptors of dialog-driven applications involving one or more categories of interactions with end users, and actions to be initiated based on analysis of end user-generated inputs, may be obtained at the dialog driven application management service. Such representations may, for example, be generated as a result of the use of one or more easy-to-use application building tools 222 by application owners. The application building tools 222, may, for example, include a multi-step dialog setup coordinator responsible for enabling application developers to specify the steps of the interactions needed to determine parameter values for fulfilling various application intents, as well as a fulfillment integration coordinator responsible for inserting the appropriate hooks for invoking resources for implementing the intents into the dialog-driven application using a composite slot type, as discussed below with regard to FIGS. 3A-3B and FIG. 4. When creating an application using such tools 222, an application owner may indicate the external task fulfilment resources to be used (if any) for the application, such as a particular function to be invoked using a dynamically-provisioned event driven computing service, and this information may be stored as part of the application descriptor or representation. Several types of configuration settings for individual categories of the interactions (or for groups of categories) may also be obtained at the dialog driven application management service 210, e.g., via one or more programmatic interfaces 212 and/or via the tools 222 in at least some embodiments. For example, an application owner may indicate that a first category of interactions of an application is to be implemented in an interruptible mode, while a second category is to be implemented in an uninterruptible mode. In some cases, various timing parameters may be specified to enable dialog driven application management service servers to determine when a particular set of user-generated input is to be considered complete, when to prompt the end user for initial input of an interaction category, and so on.

Dialog driven application management service 210 may implement machine learning resources 240. Machine learning resources 240 may be utilized not just to analyze and interpret user-generated input, but also to automatically tune some or all of the configuration settings chosen for dialog-driven applications. For example, in some embodiments, one or more machine learning-based parameter tuning models 244 may analyze user-generated input and server-generated responses of a particular dialog-driven application, collected (after obtaining the permissions of the end users via an opt-in interface) over some period of time. Such analysis may reveal, for example, statistical distributions of such interaction attributes as the number of times end users tend to interrupt server presentation of output, the durations of initial silences of user utterances, how often end users tend to switch between communication formats such as audio versus text versus dual tone multi frequency (DTMF) for different interaction categories, and so on. Using such data and the parameter tuning models 244, one or more of the configuration settings (e.g., interruptibility settings, timing parameters, etc.) of a data-driven application may be modified in some embodiments. Moreover, in some embodiments, a composite slot type may be a grammar slot type, where custom grammar can be authored (e.g., in an eXtended Markup Language (XML) or other format) to collect information in a conversation. Dialog driven application management service 210 may recognize utterances matched by the rules specified in the custom grammar. In some embodiments, semantic interpretation rules can also be provided using ECMAScript tags within the grammar files. Dialog driven application management service 210 may then return properties set in the tags as resolved values when a match occurs.

In various embodiments, dialog driven application management service 210 may implement application execution fleet 230 to host or otherwise implement applications 232 (e.g., built via tools 222 and hosted in dialog driven application management service 210).

Generally speaking, clients 250 may encompass any type of client that can submit network-based requests to provider network 200 via network 260, including requests for dialog driven application management service 210 (e.g., a request to develop a dialog driven application or a run-time request to establish a dialog communication). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other application that may make use of dialog driven application management service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like dialog driven application management service 210) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

FIG. 3A illustrates an example graphical user interface that may be used to receive a request to implement a composite slot type having multiple sub-slots, according to some embodiments.

In some embodiments, a natural language processing system such as a dialog driven application management service may provide a composite slot type interface 300 to receive a request to allow clients (for example, client(s) 250 or clients implemented internally within provider network 200 from FIG. 2) to interact with a dialog driven application management service. In some embodiments, the composite slot type interface 300 may be a graphical user interfaces having a different layout. In some embodiments, the interface may not be graphical user interface, but may be a command line interfaces and/or another programmatic interfaces that implements Application Program Interfaces (APIs). In some embodiments the composite slot type interface 300 may be similar to and/or be part of the application development and configuration programmatic interfaces 212 as described in FIG. 2).

In some embodiments, the composite slot type interface 300 may be used by application owners and developers to create and provide one or more composite slot types and a plurality of sub-slots. For example, the composite slot type interface 300 may provide a user interface to receive indications of one or more sub-slots, including information regarding the sub-slot names 302 and sub-slot types 304. In some embodiments, any number of sub-slots may have an identical sub-slot types. For example, as shown in FIG. 3A, there may be multiple sub-slots with the same sub-slot type "Colors". In some embodiments, the sub-slot name may be required to be unique and no sub-slots sharing the same name be present in the request to create the composite slot type. In some embodiments, the sub-slot types may be a multi-value slot type (or a multi-value parameter type) that requires multiple values to fulfill its slot requirements. For example, the sub-slot type "AlphaNumeric" may be such that it requires three distinct alpha-numeric values. In some embodiments, one or more sub-slot may have a grammar slot type that enables the natural language processing system 100 to recognize utterances matched by the rules specified in the grammar. In some embodiments, the sub-slots may be a composite slot type and create a nested composite slot. Moreover, the composite slot type interface 300 may allow addition of descriptions of the composite slot type to facilitate the identification of the slot. In some embodiments, the composite slot type may be associated with a unique identification. Furthermore, in some embodiments, the composite slot interface 300 may require one or more formatting requirements for the composite slot type name and/or the sub-slot name 302. For example, the formatting requirements for the slot names may include one or more of: a maximum character limit, restriction of valid characters, requirements to exclude spaces, etc.

In some embodiments, the composite slot type interface 300 may utilize the same interface as non-composite slot types. The application owners may interact with the dialog driven application management service via the composite slot type interface 300 from a variety of application owner devices in different embodiments, such as desktop computers, laptops, mobile devices and the like. Information about the dialog-driven applications, such as logical descriptors of the applications, program code (e.g., in source code or executable form), configuration settings for various stages or interaction categories of the applications, such as entity catalog(s), may be stored in an application metadata repository such as a slot catalog 430 shown in FIG. 4, in at least some embodiments.

In some embodiments, the sub-slots of the composite slot type may be requested to be obfuscated, or hidden, such that the content of the slots are not visible and/or stored in any logs via the composite slot type interface 300. Multiple methods for obfuscating a sub-slot value may be used. For example, in some embodiments, a dialogue driven application management service may obfuscate an identified sub-slot by replacing the value of the sub-slot identified in an input text with the name of the slot in conversation logs. Such obfuscation of the sub-slot values may protect sensitive data captured as sub-slot values. In some embodiments, the composite slot type may be requested to be obfuscated using the composite slot type interface 300 and all of the sub-types in the composite slot type obfuscated.

Figure 3B:
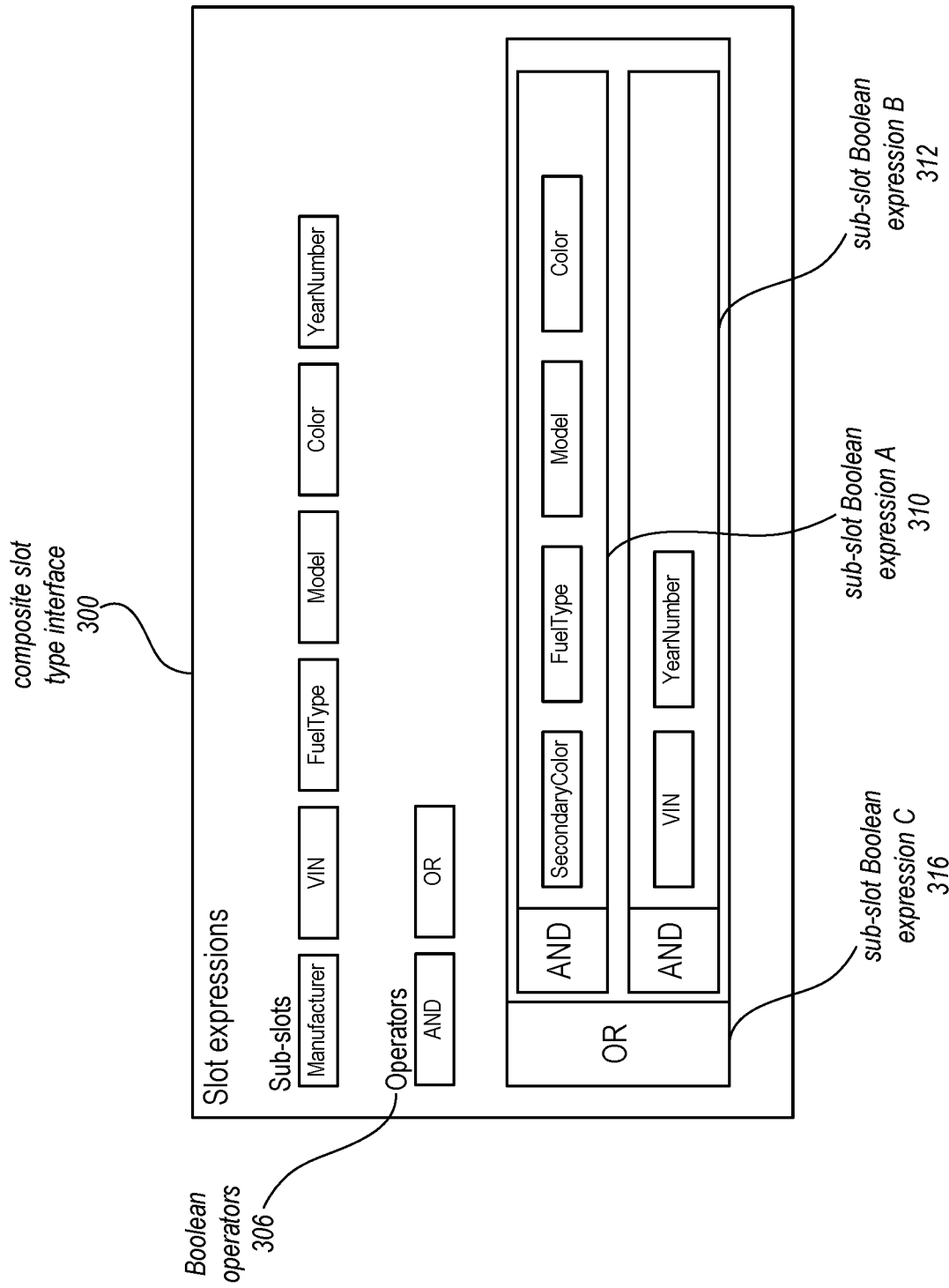
FIG. 3B illustrates another example graphical user interface that may be used to receive a request to implement a composite slot type having one or more Boolean expressions for the multiple sub-slots, according to some embodiments.

FIG. 3B illustrates another example graphical user interface that may be used to receive a request to implement a composite slot type having one or more Boolean expressions for the multiple sub-slots, according to some embodiments. As discussed above, in some embodiments, the interface may not be graphical user interface, but may be a command line interfaces and/or another programmatic interfaces that implements Application Program Interfaces (APIs).

In some embodiments, the composite slot type interface 300 may be used by an application owners and developers to create and provide one or more Boolean expressions relating the plurality of sub-slots. For example, the composite slot type interface 300 may provide a selection of sub-slots identified in the composite slot type using the composite slot type interface 300 from FIG. 3A. Using the interface, the owners of the application using the dialog driven application management service may use the Boolean operators 306 provided by the composite slot type interface 306 to generate one or more sub-slot Boolean expressions. For example, the composite slot type interface 300 may create a sub-slot Boolean expression A 310 associating "Secondary Color", "Fuel type", "Model", and "Color" together with an "and" operator. Similarly, the composite slot type interface 300 may create a sub-slot Boolean expression B 312 associating "VIN" and "Year Number" together with an "and" operator. The owner may create additional sub-slot Boolean expression C 316 by associating the sub-slots of the Boolean expressions with an "or" operator. In some embodiments, the Boolean expression from the various sub-types may enable the natural language processing system to dialog driven application management service as well as leverage the full and/or partial permutation and combination of sub-slots in driving the dialog policy. For example, the dialog driven application management service may identify that the sub-slot "Color" and "VIN" are unfulfilled and in turn generate a request to provide the required sub-slots. In some embodiments, because of sub-slot Boolean expression C 316, the dialog driven application management service may determine that the intended action associated with the composite slot type may be fulfilled based on fulfillment of the "VIN" and "Year Number" sub-slots.

Figure 4:
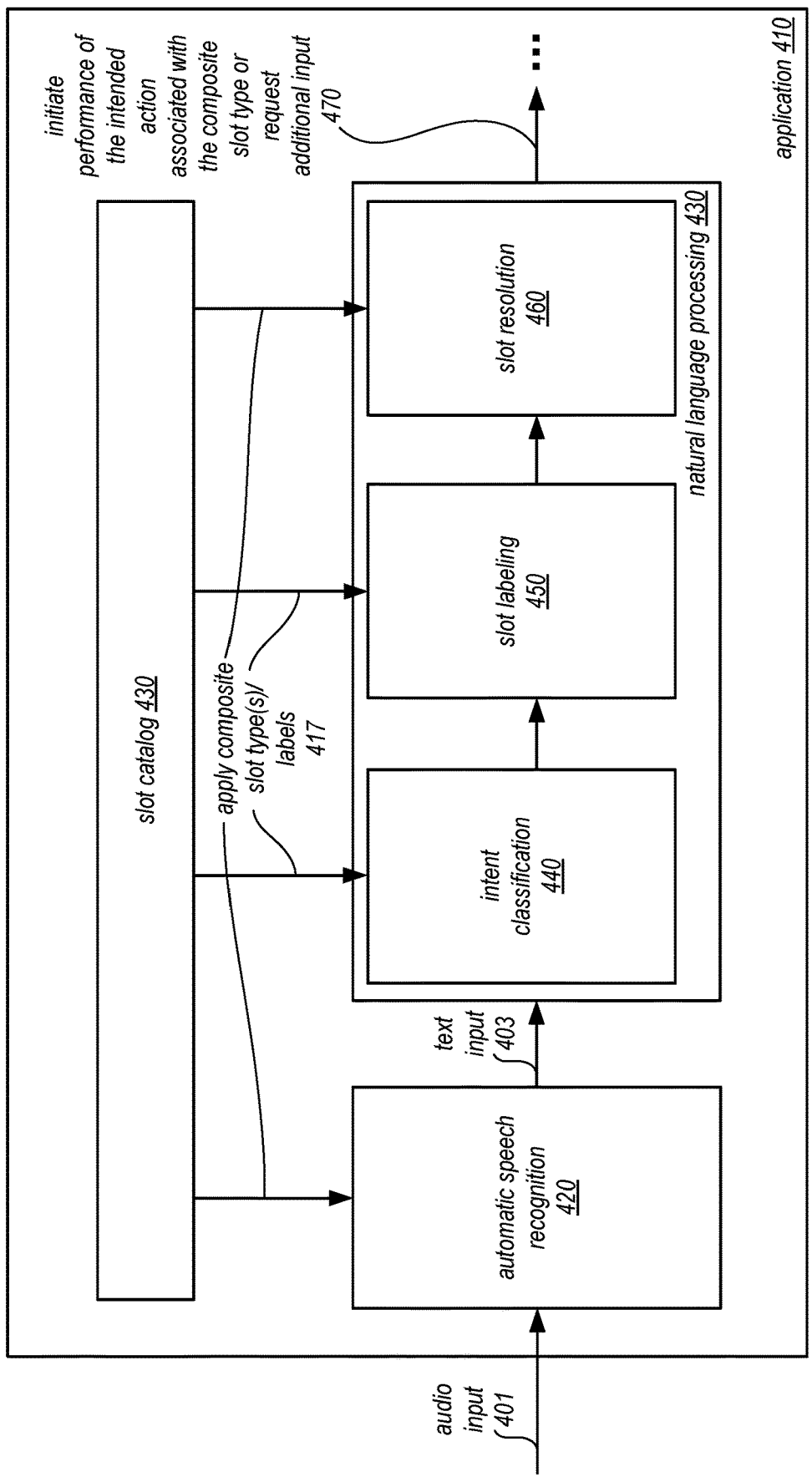
FIG. 4 illustrates a logical block diagram of applying a composite slot type to detect and initiate performance of an intended action associated with the composite slot type, according to some embodiments.

FIG. 4 illustrates a logical block diagram of applying a composite slot type to detect and initiate performance of an intended action associated with the composite slot type, according to some embodiments.

Application 410 may be similar to application 232 discussed above with regard to FIG. 2. Application 410 may implement a dialog-driven application that utilizes slot catalog 430 containing one or more composite slot type to perform various operations, including responding with further dialog (e.g., as audio dialog or text dialog). In other embodiments, other types of applications 410 may implement similar or different features including natural language understanding processing. As such, the techniques described below with regard to application of the composite slot type is not intended to be limiting.

Application 410 may implement automatic speech recognition 420 (sometimes referred to as "ASR"). Automatic speech recognition 420 may, for example, implement various machine learning models trained to recognize human speech in audio input and transcribe that human speech into human language text. Various different kinds of machine learning models, including machine learning models and techniques that utilize finite state transducers (FSTs) which may encode grammar rules or other information used for recognizing speech. In some embodiments, the FST structure may utilize various models, including one or more of a Unigram model, Bi-gram model, Acyclic model, etc. The output of automatic speech recognition 420 may be text input 403, which may be provided to natural language understanding ("NLU") 430 for further processing. In some embodiments, the ASR may be configured to apply composite slot type(s)/labels 417 in order to generate the text input 403. For example, the FST for a given audio input 410 may utilize all full or partial combination and permutations of the sub-slots in a given composite slot type to navigate the FST provided paths/structure. In some embodiments, the Natural language understanding 430 may comprise the natural language handler 160, as discussed above with regard to FIG. 1, and may perform intent classification 440, slot labeling 450, and slot resolution 460, in some embodiments. Each of these different stages may be used to provide a processed text for other application tasks. For example, an intent with different labeled slots may be used to determine responsive actions (e.g., dialog, either audio or text, or perform actions, such as request or instruct various different system operations).

In various embodiments, intent classification 440, slot labeling 450, and slot resolution 460 may be performed the respective functions upon applying composite slot type(s)/labels 417. The intent classification 440 may be implemented to understand the intent of text input 403. For example, in some embodiments, intent may be an action to be performed responsive to the text input 403. Actions may correspond to various different operations or tasks, which may include one or more workflows, programs, processes, or other instructions that are executed in order to perform the action corresponding to the determined intent. Intent classification 440 may be implemented using one (or more) trained machine learning models that provide a classification inference given for given input text, such as deep learning models, like Recurrent Neural Network (RNN) based approaches (e.g., gated recurrent unit (GRU) and long short-term memory (LTSM) models), or statistical model-based classification. The identified intent based on the intent classification 440 may be determined to be associated with the composite slot type based on the application of the composite slot type as obtained from the slot catalog 430.

In various embodiments, intents may have parameters that configure, instruct, or otherwise inform performance of the corresponding action of the intent. These parameters may be referred to as slots. For example, if an intent recognized is "Order a pizza" then the intent may have slots that correspond to "pizza size" and "delivery type" A label for a slot may provide the value of the parameter for the slot (e.g., "medium pizza" and "pickup"). Thus, natural language understanding 430 may implement different natural language processing stages for slot labeling, such as slot labeling 450 and slot resolution 460. Slot labeling 450 may, similar to intent classification 440, be one or more trained machine learning models for label prediction for slot(s) identified for an intent. In some embodiments, the slot associated with the intent that was classified may be a composite slot. The slot labeling 450 in the case of a composite slot may predict the sub-slots for the intent. For example, slot labeling 450 may utilize FSTs to for label predictions. In some embodiments, these slot label predictions of the various sub-slots of the composite slot type may then be used as input into slot resolution 460 (e.g., a slot label prediction with a highest confidence) to resolve to one of the slots provided in an entity catalog. For example, slot resolution 460 may use an index created from the entity catalog (e.g., a hash index using the different slot label values) to perform a text search for text matching the predicted slot label from the catalog using the hash index. Based on the slot resolution 460 of the various sub-slots of a composite slot type, the application may initiate performance of the intended action associated with the composite slot type or request additional input 470. For example, a new text input may be requested based on one or more sub-slots that are not satisfied in one or more required Boolean statements. In some embodiments, only the required sub-slots to fulfill one or more Boolean expressions may be requested. Upon receiving the new text input, any number of operations discussed above including ASR may be performed. In some embodiments, upon receiving a further text input, the evaluation of combination of sub-parameters of 610 may be repeated based on the further text input received. In some embodiments, the requested text input may dynamically change based on the sub-slots that are fulfilled in the new input text received. For example, based on a given input text, the question that is prompted to a user for additional input text may change. Although FIG. 4 illustrates the automatic speech recognition, the natural language understanding, the intent classification, the slot labeling, and the slot resolution in a sequential order, this is an exemplary ordering and may be rearranged. In some embodiments, the various operations may be performed in the application 410 simultaneously.

Figure 5:
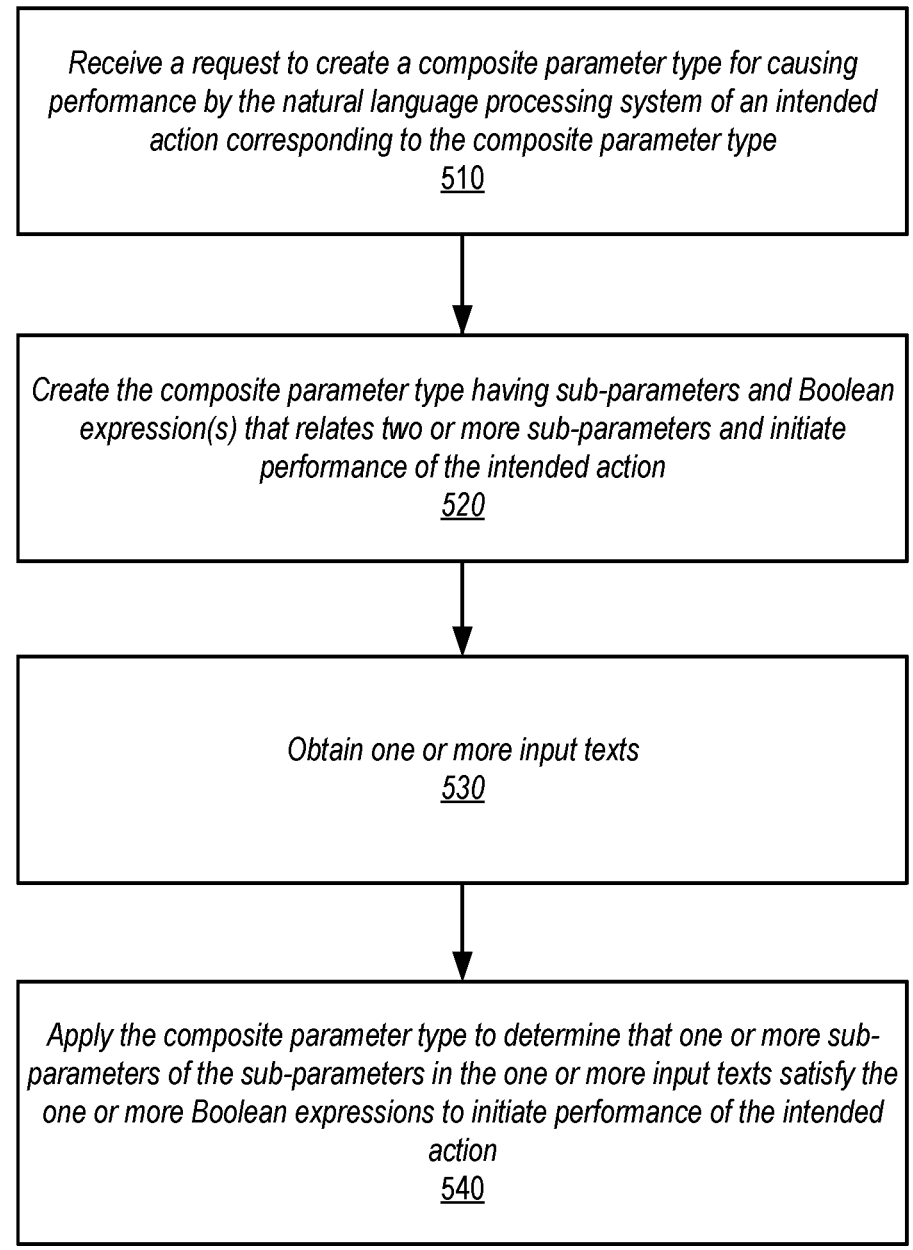
FIG. 5 is a high-level flowchart illustrating various methods and techniques to implement a data stream conversion service to create a composite slot type and apply the composite slot type to initiate performance of an intended action, according to some embodiments.

FIG. 5 is a high-level flowchart illustrating various methods and techniques to implement a data stream conversion service to create a composite slot type and apply the composite slot type to initiate performance of an intended action, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 510, a request to create a composite slot type for causing performance by the dialog driven service of an intended action corresponding to the composite slot type may be received, in some embodiments. As discussed above with regard to FIG. 3A-3B, a composite slot type interface may be used by application owners and developers to create and provide one or more composite slot types and a plurality of sub-slots. In some embodiments, the composite slot type interface may provide a user interface to receive indications of one or more sub-slots, including information regarding the sub-slot names and sub-slot types. In some embodiments, any number of sub-slots may have an identical sub-slot types and/or be a slot type that requires multiple values to fulfill its slot requirements.

As indicated at 520, the composite slot type having sub-slots and one or more Boolean expressions that relates two or more sub-slots may be created, in some embodiments. In some embodiments, the owners of an application using the dialog driven application management service may use one or more Boolean operators provided by the composite slot type interface to generate one or more sub-slot Boolean expressions. For example, the composite slot type interface may create a first sub-slot Boolean expression associating a first set of sub-types together with an "and" operator. Similarly, the composite slot type interface may create a second sub-slot Boolean expression by associating a first set of sub-types of the Boolean expressions with an "or" operator.

As indicated at 530 one or more input texts may be obtained, according to some embodiments. In some embodiments, an ASR may implement various machine learning models trained to recognize human speech in audio input and transcribe that human speech into human language text to be used as input texts. Various different kinds of machine learning models, including machine learning models and techniques that utilize FSTs which may encode grammar rules or other information used for recognizing speech.

As indicated at 540, the composite slot type to determine that the sub-slots in the received one or more input texts satisfy the one or more Boolean expressions to initiate performance of the intended action may be applied, in some embodiments. As discussed above with regard to FIG. 4, intent classification, slot labeling, and slot resolution may be performed using a composite slot type. The various sub-slots may be applied to different processes of the NLU to determine whether the one or more Boolean expressions to initiate performance of the intended action is satisfied.

Figure 6:
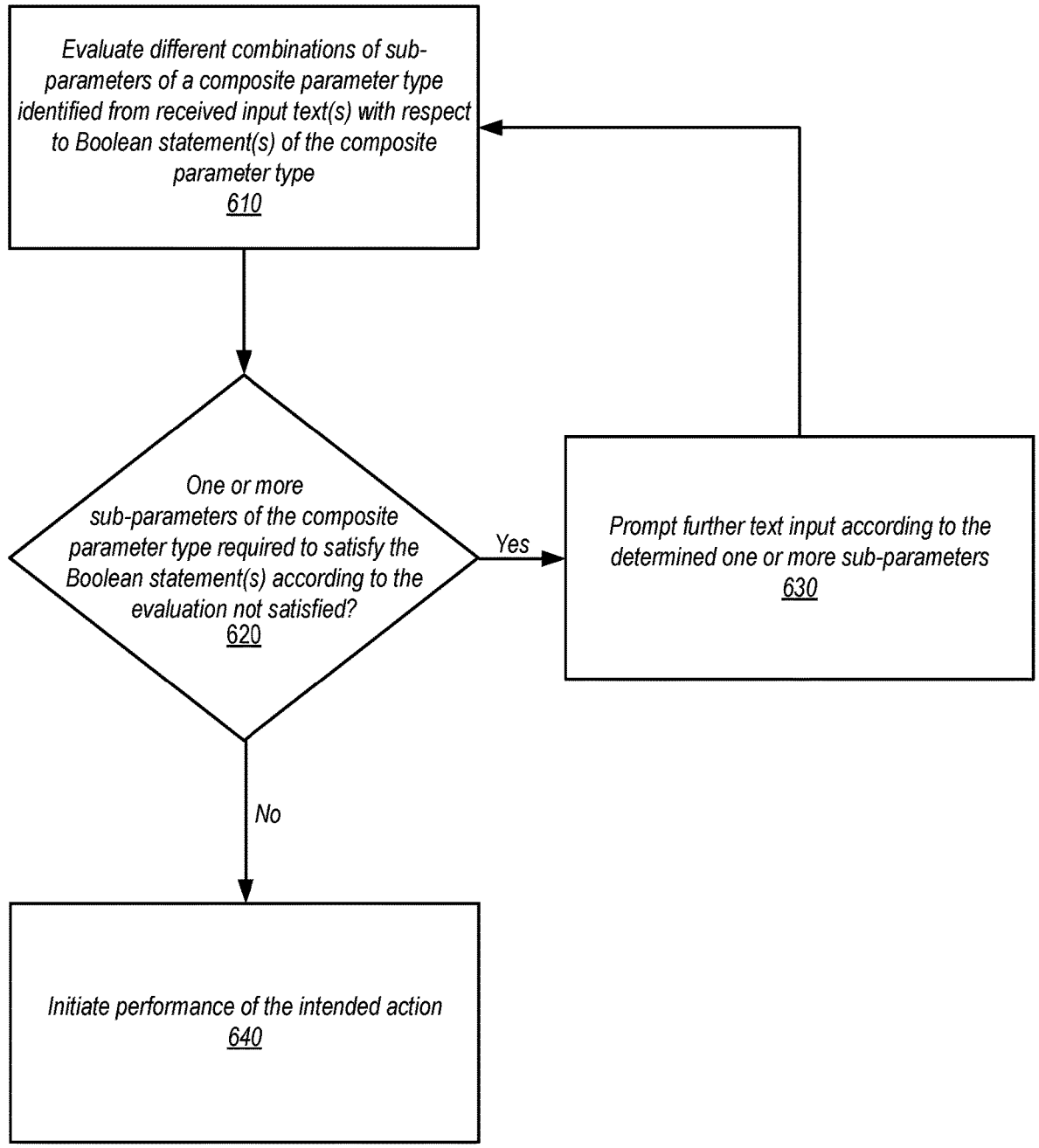
FIG. 6 is a high-level flowchart illustrating various methods and techniques to determine that one or more required sub-parameters of a composite parameter type is unfulfilled and requesting another input text for a natural language processing system, according to some embodiments.

FIG. 6 is a high-level flowchart illustrating various methods and techniques to determine that one or more required sub-parameters of a composite parameter type is unfulfilled and requesting another input text for a natural language processing system, according to some embodiments.

As indicated at 610, different combinations of sub-parameters of a composite parameter type identified from received input text(s) with respect to Boolean statement(s) of the composite parameter type may be evaluated. As discussed above with regard to FIG. 3A-3B, a composite slot type interface may be used by application owners and developers to create and provide one or more composite slot types and a plurality of sub-slots. In some embodiments, the composite slot type interface may provide a user interface to receive indications of one or more sub-slots, including information regarding the sub-slot names and sub-slot types. In some embodiments, any number of sub-slots may have an identical sub-slot types and/or be a slot type that requires multiple values to fulfill its slot requirements. Moreover, the dialog driven application management service may use one or more Boolean operators provided by the composite slot type interface to generate one or more sub-slot Boolean expressions. For example, the composite slot type interface may create a first sub-slot Boolean expression associating a first set of sub-types together with an "and" operator. Similarly, the composite slot type interface may create a second sub-slot Boolean expression by associating a first set of sub-types of the Boolean expressions with an "or" operator.

As indicated at 620, it may be determined whether the one or more sub-parameters of the composite parameter type are required to satisfy the Boolean statement(s) according to the previous evaluation, according to some embodiments. As discussed above with regard to FIG. 4, intent classification, slot labeling, and slot resolution may be performed using a composite slot type. The various sub-slots may be applied to different processes of the NLU to determine whether the one or more Boolean expressions to initiate performance of the intended action is satisfied. Furthermore, as discussed in FIG. 3B, the Boolean expression from the various sub-types may enable the natural language processing system to dialog driven application management service as well as leverage the full and/or partial permutation and combination of sub-slots in driving the dialog policy.

As indicated at 630, upon determination that the one or more sub-parameters of the composite parameter type required to satisfy the Boolean statement(s) are not satisfied according to the evaluation step in 610, further text input may be prompted according to the determined one or more sub-parameters, in some embodiments. As discussed in FIG. 4, in some embodiments, the further text input requested may be based on one or more sub-parameters that are not satisfied in one or more required Boolean statements or may be a request for multiple all sub-parameters that have not been satisfied. In some embodiments, upon receiving a father text input, the evaluation of combination of sub-parameters of 610 may be repeated based on the further text input received.

As indicated at 640, the performance of the intended action may be initiated upon determining that the one or more sub-parameters of the composite parameter type required to satisfy the Boolean statement(s), in some embodiments. As discussed in FIG. 2, intended actions may be performance of various tasks including, for example, retrieval of requested bank or credit card information from a source such as a financial organization's database, ordering of an item from a catalog, etc.

The methods described herein may in various embodiments be implemented by any combination of hardware and software. For example, in one embodiment, the methods may be implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
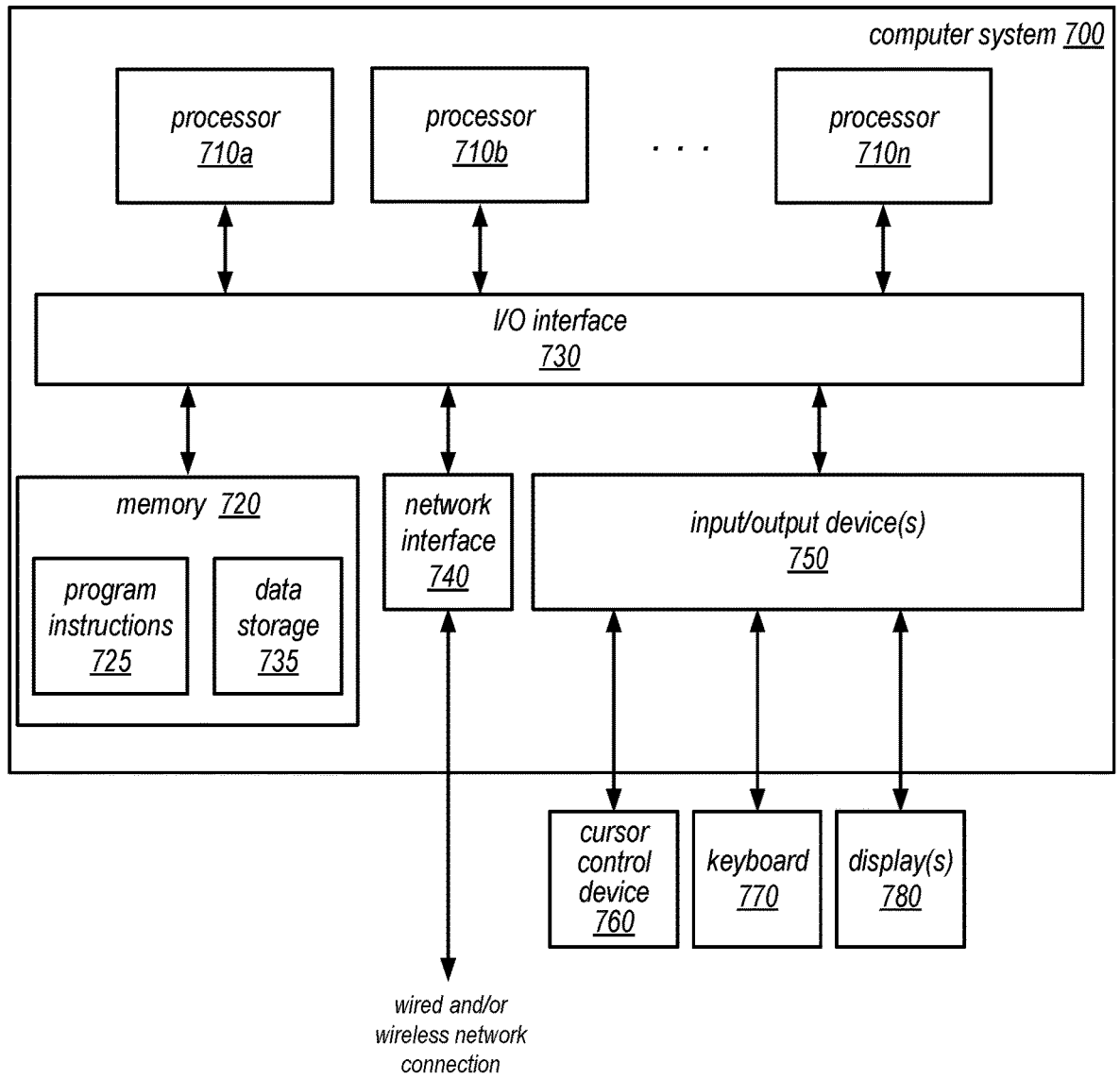
FIG. 7 illustrates an example system to implement the various methods, techniques, and systems described herein, according to some embodiments.

Embodiments depicting receiving the composite slot type and the use of the composite slot type to detect and initiate performance of an intended action associated with the composite slot type may be executed on one or more computer systems, which may interact with various other devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) 780 may include standard computer monitor(s) and/or other display systems, technologies or devices. In at least some implementations, the input/output devices 750 may also include a touch or multi-touch enabled device such as a pad or tablet via which a user enters input via a stylus-type device and/or one or more digits. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 720 may store program instructions and/or data accessible by processor 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a non-transitory, computer-readable storage medium may include storage media or memory media such as magnetic or optical media, e.g., disk or CD/DVD-ROM coupled to computer system 700 via I/O interface 730. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, that implement the various methods and techniques as described herein, including the application of the composite slot type, and data storage 735, comprising various data accessible by program instructions 725. In one embodiment, program instructions 725 may include software elements of embodiments as described herein and as illustrated in the Figures. Data storage 735 may include data that may be used in embodiments. In other embodiments, other or different software elements and data may be included.

Those skilled in the art will appreciate that computer system 700 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more computing devices, respectively comprising at least one processor and a memory that stores program instructions that cause the at least one processor to implement a dialog driven application management service, the dialog driven application management service configured to:
      receive, via the dialog driven service, a request to create a composite slot type for causing performance by the dialog driven service of an intended action corresponding to the composite slot type, wherein the composite slot type comprises a logical grouping of sub-slots that define a semantic hierarchical structure of slots for the composite slot type;
      create, via an interface of the dialog driven service, the composite slot type comprising:
         a plurality of sub-slots of the composite slot type; and
         one or more Boolean expressions to initiate performance of the intended action, wherein the respective Boolean expressions relate two or more of the plurality of sub-slots, and wherein the one or more Boolean expressions are generated based, at least in part, on one or more selections performed via the interface that define the semantic hierarchical structure of the composite slot type; and
      execute an application hosted by the dialog driven service, wherein to execute the application, the dialog driven service is configured to:

obtain one or more input texts for processing by the application; and apply the composite slot type to the one or more input texts to determine that one or more of the plurality of sub-slots in the one or more input texts satisfy one of the one or more Boolean expressions to initiate performance of the intended action.

2. The system of claim 1, wherein to apply the composite slot type to the one or more input texts, the dialog driven application management service is configured to evaluate the one or more Boolean expressions to identify a required sub-slot to initiate performance of the intended action.

3. The system of claim 2, wherein to apply the composite slot type to the one or more input text, the dialog driven application management service is configured to:

determine that the required sub-slot is not fulfilled by a first obtained input text of the one or more input texts; and prompt a second input text according to the required sub-slot.

4. The system of claim 1, wherein one or more sub-slots of the plurality of sub-slots are obfuscated.

5. The system of claim 1, wherein to execute the application that uses the dialog driven application management service, the application receives audio data and generates the one or more input texts according to one or more automatic speech recognition techniques applied to the audio data.

6. A method, comprising:

receiving, via an interface for a natural language processing system, a request to create a composite parameter type for causing performance by the natural language processing system of an intended action corresponding to the composite parameter type, wherein the composite parameter type comprises a logical grouping of sub-parameters that define a semantic hierarchical structure of parameters for the composite parameter type;

creating, by the natural language processing system, the composite parameter type, wherein the creating comprises:

determining, based on the request, a plurality of sub-parameters of the composite parameter type; and generating one or more Boolean expressions to initiate performance of the intended action, wherein the respective Boolean expressions relate two or more sub-parameters, and wherein the one or more Boolean expressions are generated based, at least in part, on one or more selections performed via an interface of the natural language processing system that define the semantic hierarchical structure of the composite parameter type; and applying, by the natural language processing system, the composite parameter type to determine that one or more sub-parameters of the plurality of sub-parameters in one or more input texts obtained at the natural language processing system satisfy the one or more Boolean expressions to initiate performance of the intended action.

7. The method of claim 6, wherein applying the composite parameter type further comprises evaluating possible combinations of the one or more Boolean expressions to identify a required sub-parameter of the plurality of sub-parameters to initiate performance of the intended action.

8. The method of claim 7, wherein applying the composite parameter type further comprises:

determining that the required sub-parameter is not fulfilled by a first obtained input text of the one or more input texts; and prompt a second input text according to the required sub-parameter.

9. The method of claim 6, wherein two or more sub-parameters of the plurality of sub-parameters have an identical parameter type.

10. The method of claim 6, further comprising:

receiving audio data via an interface of the natural language processing system;

applying, by the natural language processing system, one or more automatic speech recognition techniques to generate the one or more input texts from the audio data.

11. The method of claim 6, further comprising evaluating, by the natural language processing system, a first one of the one or more input texts as invoking the intended action corresponding to the composite parameter type.

12. The method of claim 6, wherein the one or more sub-parameters of the plurality of sub-parameters have one or more sets of parameters and wherein the one or more Boolean expressions comprise the one or more sets of parameters.

13. The method of claim 6, wherein one of the plurality of sub-parameters comprises a multi-value parameter type requiring multiple values to be fulfilled.

14. One or more non-transitory, computer-readable storage media, storing program instructions that when executed on or across one or more computing devices cause the one or more computing devices to implement:

receiving, via an interface, a request to create a composite parameter type for causing performance of an intended action corresponding to the composite parameter type, wherein the composite parameter type comprises a logical grouping of sub-parameters that define a semantic hierarchical structure of parameters for the composite parameter type;

creating the composite parameter type, wherein the creating comprises:

determining a plurality of sub-parameters of the composite parameter type;

generating one or more Boolean expressions to initiate performance of the intended action, wherein the respective Boolean expressions relate two or more sub-parameters of the plurality of sub-parameters, and wherein the one or more Boolean expressions are generated based, at least in part, on one or more selections performed via the interface that define the semantic hierarchical structure of the composite slot type; and applying the composite parameter type to determine that one or more of the plurality of sub-parameters in one or more input texts satisfy the one or more Boolean expressions to initiate performance of the intended action.

15. The one or more non-transitory, computer-readable storage media of claim 14, wherein one or more sub-parameters of the plurality of sub-parameters are obfuscated.

16. The one or more non-transitory, computer-readable storage media of claim 14, storing further program instructions that when executed on or across the one or more computing devices, cause the one or more computing devices to further implement:

receiving audio data via the interface; and applying one or more automatic speech recognition techniques to generate the one or more input texts from the audio data.

17. The one or more non-transitory, computer-readable storage media of claim 14, wherein the program instructions cause the one or more computing devices to further implement evaluating a first one of the one or more input texts to identify the intended action corresponding to the composite parameter type.

18. The one or more non-transitory, computer-readable storage media of claim 14, wherein the one or more sub-parameters of the plurality of sub-parameters have one or more sets of parameters and wherein the one or more Boolean expressions comprise the one or more sets of parameters.

19. The one or more non-transitory, computer-readable storage media of claim 14, wherein the one or more sub-parameters of the plurality of sub-parameters comprise a multi-value parameter type requiring multiple values to be fulfilled.

20. The one or more non-transitory, computer-readable storage media of claim 14, wherein the one or more computing devices are implemented as part of a dialog driven application management service offered by a provider network.

\* \* \* \* \*